3,311,167
SECONDARY RECOVERY TECHNIQUE
Leo J. O'Brien and Le Roy W. Holm, Crystal Lake, Ill., assignors, by mesne assignments, to Union Oil Company of California, Los Angeles, Calif., a corporation of California
No Drawing. Filed Nov. 21, 1963, Ser. No. 325,439
10 Claims. (Cl. 166—9)

This invention relates to the recovery of petroleum from underground reservoirs, and is more particularly concerned with a flooding process for recovering petroleum in greater amounts than is possible by conventional flooding techniques. This application is a continuation-in-part of application Ser. No. 247,498, filed Dec. 27, 1962, and now abandoned.

It is well known in the secondary recovery art to inject a slug of fluid which is miscible with both the petroleum oil in the reservoir and with water, and to drive this slug of fluid through the reservoir by injecting flood water behind it. Typical of the fluids in such secondary recovery processes are lower alcohols. When the fluid is an alcohol and it is attempted to form and maintain zones of oil-alcohol and water-alcohol miscibility, with a buffer zone of alcohol between the aforementioned zones, as they move through the reservoir from the injecting well to the producing well, serious difficulties are encountered. The presence of large volumes of water in the reservoir hinders the removal of petroleum by such miscible phase displacement processes because alcohol dissolves in the reservoir water, deteriorating the alcohol bank. Because of the high solubility of the injected solvent in the reservoir water, the leading edge of the solvent zone becomes diluted with water, and the solvent zone may break down entirely, with the result that the oil-to-solvent-to-water miscible displacement is lost. This results in lower oil recovery, causes high water-to-oil production ratios at the producing wells, and increases the alcohol requirement for a given petroleum recovery.

Deterioration of the alcohol bank can be avoided and improvement of the miscible displacement process can be obtained in treating reservoirs containing high concentrations of reservoir water by first injecting a slug of a gas into the reservoir, before the injection of solvent. The purpose of gas injection prior to the solvent injection is to reduce the water saturation in a large portion of the area which will be contacted by the solvent. The solvent in fact drives the gas through the reservoir, and the gas tends to prevent deterioration of the solvent bank by water. It has been found that still greater improvement in recovery of petroleum from reservoirs containing high water-to-oil ratios can be obtained if a foam is injected through the input well and into the formation or produced downhole or formed immediately in the formation, prior to the injection of solvent.

Briefly, this invention teaches a process for the recovery of oil from reservoirs containing high concentrations of reservoir water comprising the steps of first injecting an an aqueous solution of high foaming surfactant into the formation, then injecting a slug of gas which is substantially insoluble or has a limited solubility in the petroleum contained in the reservoir and has only limited solubility in water, then injecting a quantity of a solvent such as alcohol which is soluble in both petroleum and flood water, and finally injecting flood water to drive the gas and solvent through the formation to a producing well. The function of the aqueous surfactant solution and gas injected prior to the solvent is to produce a stable foam in the formation, which foam is effective in reducing the water saturation ahead of the solvent bank and thereby preventing deterioration of the solvent bank. In some instances it is advisable to alternate the surfactant and gas injection prior to introducing the solvent into the reservoir. The alternate injection of the surfactant solution and gas has for its advantage the phenomenon that a lesser amount of surfactant will adsorb on the reservoir rock thereby permitting more efficient foam formation in the reservoir. Where a reservoir has a high clay content, more surfactant solution will be required to replace that amount of surfactant lost due to the affinity of surfactants to adsorb more readily on high clay content rock.

It is an object of this invention to provide an improved method for the secondary recovery of oil from underground reservoirs.

Another object of this invention is to provide a method for recovering higher percentages of petroleum in reservoirs which contain high concentrations of water.

Still another object of this invention is to provide a method of using surfactants in an improved solvent secondary recovery process whereby more efficient foam formation is obtained in the reservoir.

The injection of aqueous surfactant solution and gas having low solubility in petroleum, prior to the injection of liquid solvent which is soluble in both the petroleum oil and the subsequently injected floor water, is contrary to principles taught in the prior art. The prior art considers the injection of a highly mobile gas before the injection of a miscible solvent disadvantageous in that it results in disruption of continuity in the oil phase in the reservoir, and tends to cause fingering and bypassing of oil-containing zones, and thereby reduces flood efficiency. It has nevertheless been found that where the reservoir to be treated contains water in the amount of about 0.3 pore volume or more, the disrupting effects of the gas injected prior to the miscible solvent is minimized, and the efficiency of the process is enhanced by reduction in water saturation, the avoidance of loss of solvent to the reservoir water, and the avoidance of dilution of solvent at the leading edge of the solvent-flood front, which would otherwise leave an oil phase as residual in the formation and render the flood ineffective. Accordingly, it has been found that by injecting an aqueous surfactant solution and a larger amount of gas, either in sequential slug form or in repetitive small slug form prior to the injection of miscible solvents, when treating reservoirs having a water concentration of not less than about 0.3 pore volume, the efficiency of recovery is raised far above that possible by conventional solvent flooding.

In carrying out the process of this invention, a quantity of water containing a small amount of surfactant of the high-foaming type, sufficient in amount to produce a stable foam when the water slug is contacted by a gas, is injected. While the quantity of the aqueous surfactant solution injected is not to be taken as finite, reservoir conditions and economical considerations will usually dictate a quantity lying within about the 0.005 to 0.5 reservoir pore volume range with an inherent pragmatic range of about 0.005 to 0.15 reservoir pore volume being established. The concentration of surfactant is ordinarily in the range of 0.1 to 5% by weight of the total amount of water injected. Following the injection of the aqueous surfactant solution, a slug of gas having low solubility in petroleum, in the amount of about 0.05 to 0.5 reservoir pore volume, is then injected through the input well and into the petroleum reservoir. The volume of gas injected must be sufficient to form a foam bank which will substantially displace the formation water and maintain an effective buffer between the formation water and the later-injected solvent. While quantities of gas in the range of 0.05 to 0.5 pore volume may be employed, in most instances it will be preferred to use not more than about 0.2 pore volume of gas measured at injection temperature and pressure. The foregoing amounts of surfactant solution and gas may be injected into the reservoir in small repetitive slugs such that foam is formed within the reservoir long before the entire amount of surfactant solution is injected. Introduction of the surfactant solution into the reservoir in this manner will decrease the amount of surfactant lost by rock adsorption since the surfactant will adsorb on the reservoir rock to a lesser degree when entrained in foam than when contained in an aqueous solution.

A slug of a suitable solvent which is soluble in both petroleum oil and water, and preferably is miscible with both oil and water, is injected into the reservoir behind the first injected gas. The volume of solvent injected is not critical, but quantities less than 0.03 pore volume are seldom effective, and quantities in excess of about 0.2 reservoir pore volume increase the expense of the process without producing a proportionate increase in the amount of oil ultimately recovered. Finally, flood water is injected in a conventional manner to drive the previously injected gas and solvent slugs towards the producing well. This final water injection is continued until the water-to-oil ratio at the producing well rises to such a level that further oil recovery becomes uneconomical, at which time injection is terminated. This process is applicable to any of the standard flooding patterns, such as the line-drive, five-spot, or nine-spot systems. While not essential, it is preferred that the producing wells be closed during the period of gas injection, to minimize fingering of the foam bank through the reservoir and to reduce the unfavorable effects of the high mobility of the gas upon sweep efficiency, and to further enhance the effectiveness of the foam bank in preventing dilution of solvent by reservoir water.

A wide variety of gases are available which may be used in carrying out the process of this invention. The gas chosen must have a solubility in petroleum not greater than about 10% by weight at reservoir temperature and pressure, and should be substantially inert, that is, chemically non-reactive under reservoir conditions. It is also desirable, but not essential, that the gas have a solubility not greater than about 10% by weight in the water. Suitable gases include, but are not limited to nitrogen, flue gas, air, and natural gas which is substantially free of components heavier than ethane.

Similarly, a wide variety of materials are available which may be used as the solvent, it being required only that the solvent be liquid in physical state, capable of dissolving at least 10% of its weight of petroleum, and soluble in water to the extent of at least 10% of the weight of the water. Preferably, the solvent will be miscible with both petroleum oil and water, and still more preferably will have a partition coefficient favoring solution in oil when in the presence of both oil and water. Typical suitable solvents are partially oxidized hydrocarbons such as alcohols, including tertiary butanol, secondary butanol, n-butanol, isopropanol, n-propanol, and pentanols. Other suitable materials include ketones, such as methylethyl ketone, diethyl ketone, and di-n-propyl ketone; aldehydes such as acetaldehyde, propionaldehyde and butyraldehyde, and organic acids such as acetic acid, propionic acid, butyric acid, and isobutyric acid. Mixtures of the aforenamed liquids may also be used in the process of this invention. Mixtures of partially oxidized hydrocarbons produced by hydrocarbon oxidation processes comprising a wide variety of alcohols, aldehydes, ketones and acids, and other constituents, in mixture, may be used provided the weighted average of the solubilities of the constitutents of the mixture in petroleum is suitably high. Such mixtures may contain minor amounts of material having a low solubility in petroleum, such as methyl and ethyl alcohols, provided the quantities of such constituents are not excessive and other more soluble constituents are present in quantity. Mixtures of $C_3$ to $C_7$ alcohols, ketones, aldehydes, and organic acids are suitable.

The foaming surfactant employed in the aqueous surfactant slug or slugs must be water-soluble at least to the extent in which it is incorporated. Suitable water-soluble surfactants include iso-octyl phenol polyethoxy ethanols, having about 9 to 10 ethoxy groups per molecule, sulfonated alkyl esters, and sodium lauryl ether sulfate. These materials are merely exemplary of a wide variety of high-foaming, water-soluble surfactants which are reasonably compatible with reservoir water and capable of producing large quantities of stable foam when contacted by a gas. Other suitable surfactants can be selected from published lists describing numerous surfactants and their properties.

The term high-foaming surfactant as used in this specification and the appended claims denotes a surfactant which, when placed in solution in water in the amount of 5% by weight or less, is capable of producing large quantities of stable foam. The suitability of surfactants for use in the method of this invention may be experimentally determined by incorporating 5% or less, by weight of the selected surfactant in water, which is preferably typical in solids content to the water to be injected. About 500 milliliters of the aqueous surfactant solution is placed in a graduated cylinder to form a liquid column 50 centimeters in height. Gas is then introduced from the bottom of the column through a fritted glass disc, at substantially atmospheric pressure, and permitted to bubble upward through the column, at a rate of 500 milliliters of gas per minute, per square centimeter of column cross-sectional area. After the gas has bubbled through the column of liquid for a period of about 15 minutes, the height of the column of foam produced above the liquid is measured, and should be not less than about 150 centimeters. High-foaming surfactants, in accordance with this specification, are those which will meet the aforedefined test. It is preferred to employ surfactants capable of meeting the afore-described test with respect to foam quantity when the amount of surfactant employed is substantially less than 5% by weight of water. In general, it is preferred to maintain the amount of surfactant added at a minimum, both for reasons of economics, and to avoid the production in the formation of a foam of excessive thickness which may tend to plug the formation. It will be understood that the quantity of surfactant to be added may vary depending upon the salt content of the water employed, but that the weight of surfactant will be in the range of 0.5 to 5% and that the best amount may be readily determined by the aforedescribed experiment.

The effectiveness of the method of this invention has been established by comparative experiments. In experiments 1 and 2, a core having a low water content and a core having a high water content were treated by prior art solvent-flood techniques to establish the detrimental effect of high water concentration on flood efficiency. Except as set out in the examples, the test conditions were substantially identical.

Example I

A Berea sandstone core having a water saturation of 0.62 pore volume and an oil saturation of 0.38 pore volume was flooded by first injecting 0.2 pore volume of isopropanol, and then driving the isopropanol through the core by injection of water. When the water-to-oil ratio in the fluids produced from the core reached a value of 100 to 1, the oil recovery was found to be 31.6% to the oil initially in place indicating that poor efficiency was achieved when the initial water saturation of the core was high. The residual oil remaining after this flood was about 26% pore volume.

Example II

A Berea sandstone core having a water saturation of 0.39 pore volume and an oil saturation of 0.61 pore volume was flooded in a manner substantially identical to that used in Example I. When the water-to-oil ratio reached a value of 100 to 1, the oil recovery was found to be 45.9% of the oil in place indicating that a higher flooding efficiency was achieved when the initial water saturation of the core was low.

Additional experiments were carried out upon sand pack cores of very high water saturation to strike a comparison between the conventional miscible solvent flood process, a similar process wherein a slug of gas is injected into the reservoir before the solvent, and lastly the process of this invention wherein a quantity of aqueous surfactant solution is injected, followed by a slug of air, which in turn is followed by solvent flood.

All floods were carried out on a core comprising No. 16 sand packed in a tube 6 feet long and 1 inch in diameter. The oil used consisted of 40% white oil, 40% VMP naptha, 10% kerosene and 10% of a mixture of liquid hydrocarbons obtained by the distillation of the liquid remaining after the lighter hydrocarbons have been removed from petroleum and marketed under the tradename "Nujol." In each case, the core was prepared by initially completely saturating the sand with water, then flooding the core with oil to a minimum water saturation, and finally flooding the core with water to residual oil. Residual oil saturation is achieved when injection of additional quantities of water into the core results in the removal of no additional quantities of oil, that is, the core effluent is devoid of oil. This condition is reasonably representative of the condition of petroleum reservoirs which have been subjected to water flood to the economic limit of oil production. This is the kind of reservoir to which the process of this invention is especially suited.

In each experiment the gas injected was air, and the solvent was isopropyl alcohol. Flood water was then passed through the core until oil again no longer appeared in the core effluent. The oil recovery is expressed in terms of the percent of oil initially in place in the core which was recovered. In each of the three runs temperature was maintained at 75±3° F., and the injection pressure was 25 p.s.i. The volume of gas injected was measured at injection temperature and pressure. Experimental conditions, except as set forth in Table I, were maintained as uniform as practical between runs.

TABLE I

| Run | Initial Condition | | Material Injected, Pore Vol. | | | Percent Oil Recovered |
|---|---|---|---|---|---|---|
| | Percent Oil | Percent Water | Surfactant Sol. | Air | Solvent | |
| 1 | 17.9 | 82.1 | 0 | 0 | 0.25 | 53 |
| 2 | 17.9 | 82.1 | 0 | 15 | 0.25 | 62 |
| 3 | 15.8 | 84.2 | 0.1 | 8.0 | 0.25 | 69 |

Examination of the data of Table I establishes the superiority of the method of this invention. The surfactant solution injected was a solution of 1.0% by weight of dioctyl sodium sulfosuccinate in distilled water.

As a specific example of this invention, a reservoir which has previously been waterflooded has a residual water concentration of 0.4 pore volume. An aqueous solution in the amount of 0.5 reservoir pore volume containing 5% by weight of dioctyl sodium sulfosuccinate is injected into the reservoir followed by .05 reservoir pore volume of air. Thereafter 0.2 reservoir pore volume of isopropyl alcohol is injected followed by the injection of flood water. There is produced from the reservoir a mixture of fluids comprising water, gas, foam, isopropyl alcohol and a higher percentage of petroleum oil than is expected when surfactant solution and gas does not precede the solvent slug.

The embodiments of the invention in which an exclusive property or privilege is claimed are defined as follows:

1. A method for recovering oil from a petroleum reservoir penetrated by an injection well and at least one spaced production well, which comprises:
   injecting an aqueous surfactant solution through said injection well and into said reservoir, said solution having a surfactant content sufficient to produce a stable foam on being contacted by a gas;
   injecting about 0.05 to 0.5 pore volume of drive gas through said injection well and into said reservoir;
   thereafter injecting a slug of liquid solvent which is miscible with both oil and water;
   driving said solvent through said reservoir by the injection of flood water; and
   recovering oil from said production wells.

2. The method in accordance with claim 1 in which said producing well is shut in while air is injected through the input well.

3. The method in accordance with claim 1 in which said liquid solvent consists essentially of oxygenated hydrocarbons having 3 to 7 carbon atoms per molecule.

4. The method in accordance with claim 1 in which the volume of solvent injected is about 0.03 to 0.20 pore volume.

5. The method in accordance with claim 1 in which the amount of said aqueous surfactant solution injected is 0.005 to 0.5 reservoir pore volume.

6. The method in accordance with claim 1 in which said aqueous surfactant solution contains 0.1 to 5% by weight of surfactant.

7. The method in accordance with claim 1 wherein said drive gas has a solubility in petroleum not greater than about 10 percent by weight at reservoir temperature and pressure.

8. The method in accordance with claim 1 wherein said drive gas is selected from the group consisting of nitrogen, flue gas, air and natural gas.

9. The method in accordance with claim 1 wherein said liquid solvent is an alcohol selected from the group consisting of n-propanol, isopropanol, n-butanol, secondary butanol, tertiary butanol and pentanol.

10. A method for recovering oil from a petroleum reservoir penetrated by an injection well and at least one spaced production well, which comprises:
   injecting an aqueous surfactant solution through said injection well and into said reservoir, said solution containing about 0.1 to 5 percent by weight of a surfactant capable of producing a stable foam on said solution being contacted by a gas;
   injecting about 0.05 to 0.5 pore volume of a drive gas selected from the group consisting of nitrogen, flue gas, air, and natural gas through said injection well and into said reservoir while maintaining said production wells shut in;
   thereafter injecting about 0.03 to 0.20 pore volume of partially oxidized organic liquid through said injection well and into said reservoir, said liquid being capable of dissolving at least 10 percent of its weight of petroleum, and which is soluble in water to the extent of at least 10 percent of the weight of the water;

driving said solvent through said reservoir by the injection of flood water; and recovering oil from said production wells.

References Cited by the Examiner

UNITED STATES PATENTS

| | | | |
|---|---|---|---|
| 2,866,507 | 12/1958 | Bond et al. | 166—42 X |
| 3,175,609 | 3/1965 | Csaszar et al. | 166—9 |
| 3,177,939 | 4/1965 | Holm et al. | 166—9 |

OTHER REFERENCES

Slobod: "Research on Methods for Improving Oil Recovery From Pennsylvania Oil Fields," Producers Monthly, January 1960, pp. 16, 17, 18, 20, 21, 24–27 relied on.

CHARLES E. O'CONNELL, *Primary Examiner.*

JACOB L. NACKENOFF, *Examiner.*

S. J. NOVOSAD, *Assistant Examiner.*